TELEPHONE MESSAGE UNIT RECORDING SYSTEM
Filed May 29, 1961
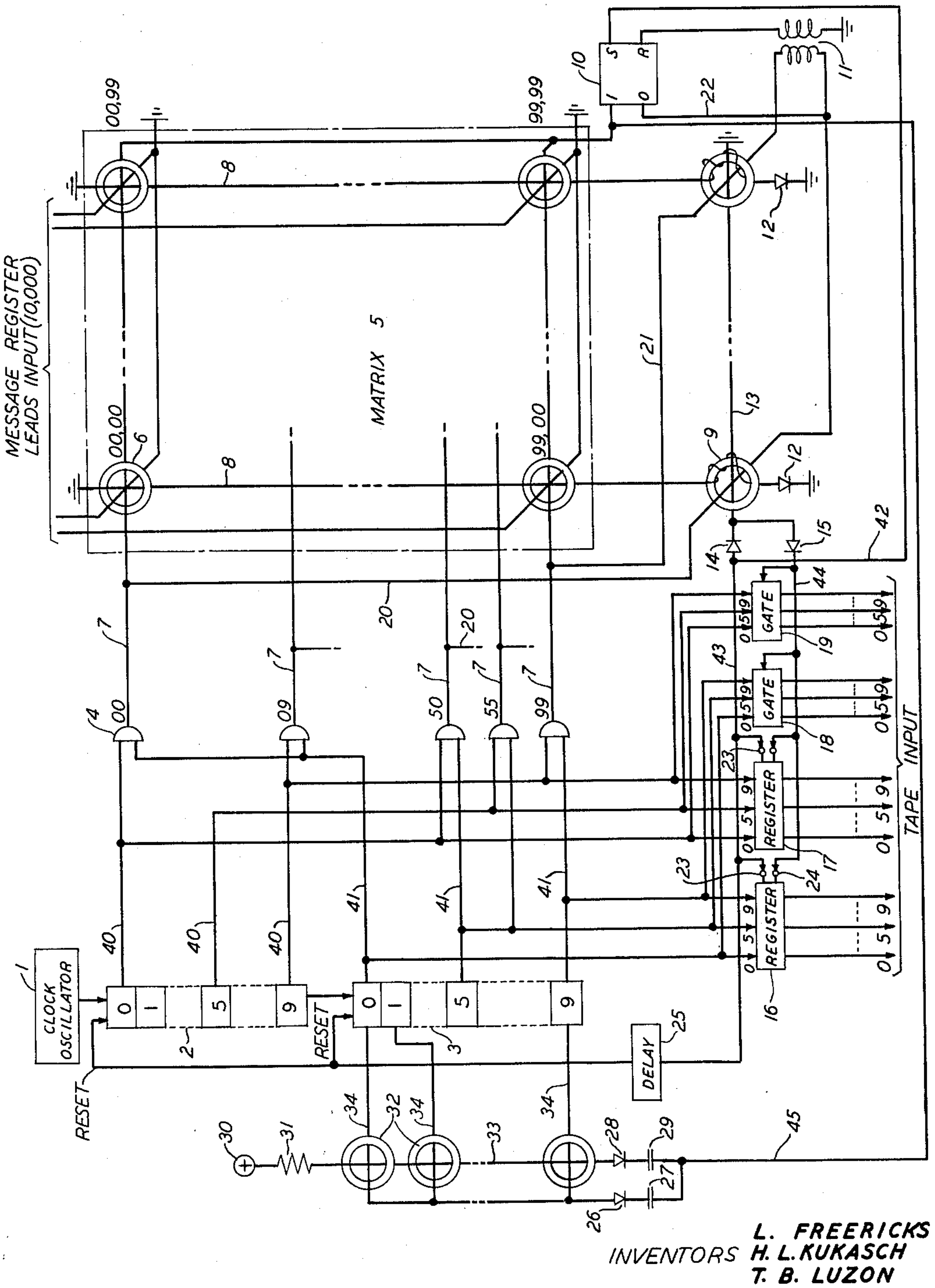
INVENTORS L. FREERICKS
H. L. KUKASCH
T. B. LUZON
BY S. E. Hollander
ATTORNEY

United States Patent Office 3,156,772

Patented Nov. 10, 1964

3,156,772
TELEPHONE MESSAGE UNIT RECORDING SYSTEM

Lambert Freericks, Hasbrouck Heights, N.J., and Herbert L. Kukasch, New York, and Thomas B. Luzon, Bayside, N.Y., assignors to American Telephone and Telegraph Company, New York, N.Y., a corporation of New York Filed May 29, 1961, Ser. No. 125,308

19 Claims. (Cl. 179—7)

This invention relates to telephone message units recording devices and, more particularly, to magnetic core matrix arrays to be incorporated therewith.

In certain telephone systems it is necessary for billing purposes to measure telephone usage in "message units" and to register these message units for each telephone subscriber. These message units may represent, for example, indications of the initial charge for a particular call or an elapsed time interval during which a subscriber has been using his telephone. These message units originate as pulses in the central office.

In present day central offices registration of these message units is usually accomplished by providing a message register for each subscriber. The pulses, representing message units to be billed, step the count of the message register by one digit per pulse, the message register being read each month to determine the total number of message units to be billed to the subscriber.

In the automatic message accounting system of No. 5 Crossbar central offices, message unit pulses representing individual subscriber line usage are usually not directed to indivdual message registers. Rather, equivalent information is punched on paper tape, this information necessarily describing not only the number of message units to be billed, but, in addition, the particular subscriber charged.

Recent registering systems have proposed the use of a magnetic core associated with each subscriber served by the local central office, the cores being arranged in rows and columns of a matrix array. Message unit pulses are directed to respective subscriber cores, setting these cores in one of the two stable magnetic states. The magnetic cores are continuously scanned, the scanning equipment causing a subscriber identification number, representing the message unit, to be recorded on the common magnetic or punched paper tape.

In conventional scanning circuits for magnetic core matrices such as those incorporated in these recent registering systems, each core is individually selected and interrogated. Each message unit pulse sets a particular core. The scanning pulses sequentially reset all cores. If in the time between successive scans a particular core has been set by a message unit pulse, the subsequent scanning reset pulse, by switching the core, gives rise to an induced voltage in a sensing lead passing through the core, this induced pulse being used for recording purposes.

However, if the time between successive message unit pulses of a particular subscriber is less than the time between successive scans, the second message unit pulse goes unrecorded because the core is already in the set state due to the previous message unit pulse. Each scan can result in at most one message unit being billed to each subscriber. For this reason, it is imperative that the scanning period be less than the time between the application of successive message unit pulses to any one subscriber core. This requirement can seriously limit the size of the matrix array as the scanning period increases with the size of the array and might normally necessitate the use of more than one matrix array with the corresponding additional scanning and recording systems.

During any particular scanning cycle it is highly improbable that every subscriber core has been set. For this reason the scanning period may be reduced if it is possible to scan a group of cores with a single scanning pulse. If no cores in this group have been set, as is often the case, then an entire group of subscriber cores has been scanned with a single scanning pulse and the period of the scanning cycle has been correspondingly reduced. Under these conditions it would be necessary to detect the absence of a flux reversal in each of the cores in the group to determine that none of them had been set by message unit pulses.

It is an object of this invention to provide an improved memory core message unit recording system for a telephone central office.

It is another object of this invention to provide a scanning sequence for a magnetic core matrix array with a reduced period of operation.

It is another object of this invention to provide for a simple scanning circuit incorporating fewer elements than those in corresponding circuits to be found in the prior art.

It is another object of this invention to provide a single scanning circuit that can be switched back and forth between rows and columns, thereby eliminating the need for a second scanning circuit.

It is still another object of this invention to provide an auxiliary memory circuit to permit a return to approximately the last row scanned when row scanning is resumed thereby avoiding scanning the first few rows only and preventing any loss of message units in the last rows of the matrix.

In the majority of present day central offices individual message register leads are connected to respective subscriber message registers. The central office equipment pulses these message register leads and the counts of the respective registers are stepped. Our invention eliminates the need for these registers and yet requires no modification in the central office pulsing equipment. The message register leads are connected to respective cores in a matrix array and pulses applied to the leads set these cores rather than step the counts of message registers. To indicate that no changes need be made in the central office pulsing equipment, the lead inputs to the cores are labeled "message register leads input," as they are in offices using registers, although these registers are not utilized in the invention.

In the illustrative embodiment of our invention the local central office serves 10,000 subscribers. The respective cores are arranged in a matrix array of 100 rows and 100 columns. There is an individual message register lead input connected to each core in the array, the message unit pulses being applied by the central office to these leads to set the respective cores.

An additional row of 100 buffer cores is provided in the scanning system and each of the 100 cores in every column is inductively coupled to one of these buffer cores. A ring counter circuit applies to a reset pulse to all 100 cores in a particular row simultaneously. Each core in this row of the matrix which has been set by a message unit pulse is reset by the scanning pulse. This resetting causes an induced voltage in the coupling lead connecting the matrix core to the buffer core and the respective buffer core is set. Effectively an entire row of information is transferred to the row of buffer cores by the application of a single scanning pulse.

In the event that any one of the 100 cores in the particular row being scanned had been set by a message unit pulse, the scanning equipment transfers from the matrix to scan the row of buffer cores. It scans each of the 100 buffer cores successively and determines which columns contained the set cores. As the row information is already known, the additional column information identifies the particular cores of the 10,000 cores that had been set by message unit pulses. These core identification numbers are recorded on the magnetic or paper tape. The scanning circuit, having reset all the buffer cores, then transfers to scanning of another row in the matrix.

This sequence of operations provides two unique advantages. First, if none of the 100 cores in a particular row has been set by message unit pulses between successive scans, as is often the case, none of the buffer cores are set by the application of the single scanning pulse to the particular row being scanned. In this event the scanning system does not transfer to scan the buffer cores for it has already determined that none of the cores in the row had been set. Instead it scans the next row in the matrix by applying the single row scanning pulse. In this manner the scanning period is appreciably reduced as 100 cores can be and often are scanned by a single pulse.

Second, in conventional arrays an individual core is most often selected by choosing the particular row and column in which it is contained. In coincident current scanning systems individual conductors pass through all cores in each row and column. The application of a current pulse to both a row and a column conductor resets only that core at the intersection of the two conductors It is necessary, therefore, in these scanning circuits to continuously select a particular conductor from both the row and column groups of conductors. Often two sets of ring counters are necessary for this purpose. However, in our invention, due to the fact that all row information is transferred to the buffer cores, the same set of ring counters that is used to apply reset pulses to the rows may be utilized for scanning the buffer cores as well. Thus, the same counting and scanning apparatus used for row scan may be used for column scan. This is advantageously achieved by providing means in the counter for remembering which row was scanned prior to the buffer scan in order that the scanning system knows which is the next row to be scanned subsequent to the buffer scan.

Thus, a feature of this invention is the provision of means for resetting an entire row of magnetic cores in a matrix array with a single pulse.

Another feature of this invention is the provision of a row of buffer cores and means for transferring the information in any row of the array to the row of buffer cores upon the application of a single scanning pulse to the array row.

It is still another feature of this invention to provide means for transferring the scanning apparatus from row scan to buffer or column scan in the event that at least one core in the row being scanned had been set by a message unit pulse between successive scans of the row.

It is still another feature of this invention to provide means for enabling the scanner to resume the scanning of the proper row subsequent to the buffer scan in the event that such a scan has taken place.

Further objects, features and advantages will become apparent upon consideration of the following description taken in conjunction with the drawing wherein the single figure shows an illustrative embodiment of the invention.

*General Description*

Referring now to the figure, the central office in conjunction with which the illustrative embodiment of this invention is utilized serves 10,000 subscribers. At the present time, this central office equipment most often applies pulses to 10,000 respective message register leads which cause respective message registers to step their count by one unit upon the occurrence of each pulse. In our invention an individual magnetic core rather than a message register is associated with each subscriber. These cores are arranged in rows and columns in matrix 5. Each core is designated by a four-digit number, the first two digits representative of the row and the second two of the column in which the core resides. Each message register lead passes through only one core and is connected to ground. The cores are of the kind having two remanent polarization states that have found increasingly widespread use in recent years. The pulses applied to the message register leads set the flux of the respective cores in a clockwise direction, the fluxes being reset in the counterclockwise direction by the scanning circuit between successive message unit pulses.

The scanning circuit comprises clock oscillator 1, ring counters 2 and 3, the 100 AND gates 4, the 100 conductors 7, and the 100 conductors 20. The scanning circuit applies successive pules to either the row conductors 7 or the buffer (column) conductors 20 but not to both groups simultaneously. Flip-flop 10 determines whether the matrix or buffer cores are to be scanned.

Each row conductor is coupled to every core in one row and the applied pulse causes the entire row of information to be transferred to the row of buffer cores 9. If at least one core in the row switches, indicative that at least one had been set by a message unit pulse, the scanning circuit transfers to scan the buffer cores to determine precisely which cores in the row were set. Ring counters 2 and 3 are also reset to zero preparatory to buffer scanning. Flip-flop 10 controls the scan transfer by connecting either conductors 7 or conductors 20 to ground, thereby enabling interrogating currents to flow either in the row conductors or the column (buffer) conductors.

Because row and buffer scanning are not simultaneous operations, the same scanner may be used for both. During row scanning, flip-flop 10 connects conductors 7 to ground. Conductors 20 do not conduct current and buffer scanning does not take place. Each row scan pulse resets all 100 cores in the row. If at least one of them switches, indicating that it had been set by a message unit pulse, row scanning must be inhibited and buffer scanning, to determine which particular cores were set, must begin. Since row scanning is inhibited, the same scanner may be used to scan the buffer cores. Flip-flop 10 disconnects conductors 7 from and connects conductors 20 to ground for these purposes.

In this manner not only can 100 cores be scanned simultaneously if none of them have been set but the same scanner may be used for two purposes. The scanning circuit is both faster and more economical as a result.

The two registers 16 and 17 store the number of the row whose information has been transferred to the buffer cores. The scan of a buffer core which has been set as a result of the resetting of a matrix core by the matrix scan pulse causes both the row number stored in registers 16 and 17 and the column number of the matrix core to be recorded on a tape for billing purposes. The two registers pulse out the row information while the two gates 18 and 19 pass the column information directly from the counting circuit to the recording means.

After column or buffer scanning, flip-flop 10 again connects conductors 7 to ground and row scanning ensues. The magnetic core circuit connected directly to ring counter 3 is provided for remembering approximately the previously scanned row number so that when row scanning is resumed it may continue from this point. The same cycle of operations now initiates for the succeeding rows.

*Detailed Description*

Message unit pulses applied to the message register leads set the flux in the cores of matrix 5 in a clockwise direction. The scanning circuit resets an entire row of cores simultaneously and, if at least one core in the row switches state, proceeds to scan the buffer cores to which the row information has been transferred. Although two distinct scanning operations are performed only one scanner is required. This scanner comprises clock oscillator 1, ring counters 2 and 3 and the 100 AND gates 4. The outputs of gates 4 are connected to the row reset conductors 7 during row scan and to the buffer reset conductors 20 during buffer scan.

Ring counter 2 is advanced by clock oscillator 1. Each pulse from the oscillator causes a succeeding stage of the counter to be energized with a corresponding signal placed on the respective lead 40. The count advances from 0 to 9, and back to 0 once again. It is a continuous cycle in the absence of triggering of the reset lead.

Ring counter 3 is similar to ring counter 2 except that the advance pulses originate from the energization of stage 9 of ring counter 2 rather than from the clock oscillator pulses. Thus, ring counter 3 counts at a rate one-tenth that of ring counter 2. A signal is placed on the lead 41 associated with the energized stage as in ring counter 2.

Each AND gate 4 is of the kind in which a pulse is applied to the output lead only if signals are placed on the two input leads 40 and 41. There are 100 of these AND gates, the output leads, designated 00 to 99, being associated with respective ones of the 100 rows of matrix 5. Only one of the AND gate outputs is enabled at one time. When row scan is initiated, the 0 stages of both ring counters are energized. The 00 AND gate is the only one of the 100 gates having signals applied to its two inputs. Consequently, the 00 conductor 7 is the only conductor to which a pulse of current is applied. When the first clock oscillator pulse advances the count of ring counter 2 by one unit the AND gate associated with the 01 conductor 7 (not shown in the figure) applies a current pulse to this conductor. Upon the application of the ninth oscillator pulse, AND gate 09 is operated. The tenth oscillator pulse causes the count of ring counter 3 to be advanced to the 1 stage and the tenth oscillator pulse causes the count of ring counter 2 to recycle to the 0 stage. AND gate 10 (not shown) is operated. This process continues until finally the ninety-ninth pulse is applied. The one-hundredth pulse resets both counters to the 0 stage, a current pulse is applied to the 00 conductor 7 and the counting cycle resumes once again.

Conductors 7 pass through the 100 cores in the respective rows of matrix 5 and are terminated at input 1 of flip-flop 10. Flip-flop 10 is of the kind having two output terminals and two input triggers. A pulse applied to the S trigger causes output 0 to be connected to ground. Output 1 is connected to ground through a high impedance and all leads connected to it are effectively open-circuited. A pulse applied to the R trigger causes output 1 to be grounded and all conductors connected to output 0 to be open-circuited. If flip-flop 10 is in the reset state, conductors 7 which are all connected to output 1 after passing through the cores in the respective rows of matrix 5 are grounded. Thus, AND gates 4 control successive current pulses through these conductors. It should be noted that current pulses do not flow through conductors 20 which are similarly connected to AND gates 4 as these conductors are all terminated at output 0 of flip-flop 10 which is effectively disconnected from ground during the reset state of flip-flop 10. These conductors 20 are not connected to ground by flip-flop 10 and are open-circuited until buffer scanning begins.

Upon energization of each AND gate 4 current flows from output 1 of flip-flop 10 through conductor 7 to the gate. This current passing through the aperture of each core in the respective row applies a counterclockwise magnetomotive force to all cores in the row. The only cores in which there are flux reversals, however, are those cores whose fluxes have been set in the clockwise direction by the application of message unit pulses subsequent to the previous scanning pulse.

There are 100 of the cores 9 arranged in a buffer row, each core being inductively coupled by a respective one of conductors 8 to all cores in a particular column. Assume, for example, that the scanning circuit applies a current pulse to the 00 conductor 7 and that core 00,00 has been previously set by a message unit pulse. The flux in this core is, consequently, reversed from the clockwise to the counterclockwise direction. This flux reversal causes an induced current to flow in the associated conductor 8 in the downward direction. This current can flow as diode 12 is poled in the downward direction and sets the flux in core 9 associated with column 00 in the clockwise direction.

The message unit pulses themselves do not cause flux changes in the cores 9 due to the incorporation of diodes 12. These pulses cause induced voltages in conductors 8 which would produce current flow in the upward direction. These currents are blocked by diodes 12.

Because a conductor 7 passes through all cores in each row, all cores that have been set by message unit pulses subsequent to the last scanning pulse applied to the same conductor 7 are switched by the scanning pulse. As each core in the row is inductively coupled to a respective one of the 100 buffer cores 9, it is seen that all cores in the scanned row which have been set by message unit pulses cause clockwise fluxes to be set into the respective buffer cores. Effectively, the entire row of information has been transferred to the row of buffer cores. Each core in the matrix row whose information has been transferred to the buffer row is now in the reset condition and can be set by the application of new message unit pulses.

In the event that none of the cores in the row scanned have been set by message unit pulses no core in the row switches upon the application of the current pulse by gate 4 to conductor 7. Thus, there is no transfer of information to the row of buffer cores. A row scanning pulse is immediately applied to the succeeding conductor 7 which transfers the information in the next row to the buffer cores. This process continues until at least one core in a scanned row has been set by a message unit pulse. This row scanning pulse results in a flux reversal in at least one of the buffer cores. When this occurs the scanner initiates a scan of the buffer cores to determine which of the cores in the particular row scanned had been set. After the buffer scan the 100 buffer cores are reset and can receive another store of row information. Row scanning ensues.

In this manner entire rows may be interrogated by single reset pulses if no core they contain have been set by message unit pulses. Buffer scanning begins when an interrogated row does contain at least one set core. Conductor 13 is incorporated for automatically transferring the scanner from row to buffer scanning.

Conductor 13 is inductively coupled to each one of the buffer cores. If at least one of the buffer cores has its flux set in the clockwise direction due to the application of a row scanning pulse to a row which contains at least one set core, a voltage is induced in conductor 13 which causes current flow from left to right. This current is an indication that the scanner must now interrogate the buffer cores. Conductor 13 is connected to both diodes 14 and 15, these diodes being poled in opposite directions. When a voltage is induced in conductor 13 causing current flow from left to right only diode 14 conducts. Current flows from conductor 13 to both conductors 42 and 43. Conductor 42 is connected to the S trigger of flip-flop 10 and the induced voltage in conductor 13 causes the flip-flop to change state. Output 1 is now open-circuited and thus during the subsequent buffer scan conductors 7 do not carry current and the matrix cores remain unaffected. Output 0 is now grounded and conductors 20 which are coupled through the buffer cores and connect the outputs of the AND gates to output 0 are now grounded. It is current flowing through these 100 conductors 20 which interrogate the buffer cores.

It is necessary to record the number of the row whose information has just been stored in the buffer cores. Conductor 43 is connected to terminals 23 of both registers 16 and 17. These registers each have ten inputs, the ten inputs of register 17 being connected respectively to the ten outputs of ring counter 2 for registering the units digit of the row being interrogated.

Register 16 is connected in a similar manner to ring counter 3 and stores temporarily the tens digit of the row being interrogated. The registers may be thought of as containing ten individual bistable elements, with only that element which is connected to the energized stage of the associated ring counter being set upon the application of triggering pulses to terminals 23. All other elements, being connected to unenergized stages of the ring counters, are in the reset condition. In the subsequent operation of the two ring counters the information stored in registers 16 and 17 remains unaffected. Information is changed in these registers only upon the application of pulses to terminals 23.

Conductor 43 is also connected through delay 25 to the reset inputs of the two ring counters. The induced pulse causes both ring counters to be reset to 0 so that the AND gates will be successively energized beginning with the first one, 00. Delay 25 is included to permit the units and tens digits to be stored in registers 16 and 17 and to permit flip-flop 10 and the buffer cores to completely switch before the initiation of buffer scanning.

Conductors 20, all connected to respective ones of the 100 AND gates pass through the buffer cores and are connected to the now grounded output 0 of flip-flop 10. A current pulse is first applied to conductor 20 associated with AND gate 00. Thus current flows in such a direction as to set flux in the buffer core associated with column 00 in a counterclockwise direction. If the core in column 00 of the row being interrogated had been set by a message register pulse the row scanning pulse has caused a clockwise flux to be set in the first buffer core. The column scanning pulse now reverses this flux direction. If the first core in the row had not been set by a message register pulse the transfer of the row information to the buffer cores has maintained the normal counterclockwise direction of flux in the first buffer core. Thus, the column scanning pulse does not switch the flux direction in this first buffer core.

If the first core of the row being scanned had been set by a message register pulse, the consequent flux reversal in the first buffer core induces a voltage in conductor 13 that causes current flow from right to left. Diode 14 blocks this current while diode 15 now permits its flow. This induced voltage is an indication that the subscriber associated with the first core in the particular row being scanned is to be billed one message unit. Suppose this row is row 59, the subscribed under consideration thus being associated with core 59,00. Register 16 has temporarily stored the digit 5 and register 17 the digit 9. Gate 18 is in effect ten separate gates connected, respectively, to the ten stages of ring counter 3. Similar remarks apply to gate 19 and ring counter 2. Only one of the ten input leads connected to each of these gates is energized at any particular time. Conductor 44 connected through diode 15 to conductor 13 is connected to the control terminal of both gates and to terminals 24 of registers 16 and 17. The induced voltage pulse on conductor 44 triggers these four devices. The two gates merely connect the ten respective input leads to the ten respective output leads. Only the one lead in each group of ten that is energized by the associated ring counter causes its respective output lead to be energized. The energization of this lead causes the respective recording head in the recording instrument (not shown) to record the correct digit on the magnetic tape. In the example under consideration, gates 18 and 19 both cause a 0 to be recorded on the tape. The particular recording scheme may be one of many. For example, the tape may contain 40 tracks separated into four groups of ten each. A signal on one of each group of ten output leads may cause a signal to be recorded on the tape in the respective track.

The application of the induced voltage on conductor 44 to terminals 24 of the two registers causes the two set bistable elements to apply pulses to their output leads, in this case lead 5 of register 16 and lead 9 of register 19. Thus, the number 59 is recorded on the tape before the digits 00. The tape now contains the number 5900, indicative of the fact that the subscriber associated with core 59,00 is to be billed one message unit. The 5 and the 9, respectively, in registers 16 and 17 are not destroyed by the application of the gating pulse to terminals 24. The digits 5 and 9 are retained in the registers to be again recorded on the tape in the event that any one of the succeeding 99 buffer cores has been set by the application of the row scanning pulse to row 59 of matrix 5.

AND gate 01 (not shown) next causes current to flow through the respective conductor 20. If the second buffer core has been set by the row scanning pulse the subsequent operation is identical except that the lead connecting stage 1 of counter 2 to gate 19 is now energized. Thus, the number recorded on the tape is 5901.

In the event that subscriber 59,01 is not to be billed a message unit, the second buffer core already has a flux in the counterclockwise direction upon the application of the scanning pulse to the 01 conductor of conductors 20. Thus, there is no flux reversal in this core and no corresponding induced voltage in conductor 13. A third pulse is applied to the third buffer core and the number 5901 is not recorded on the tape as the two gate triggers and the two terminals 24 of registers 16 and 17 have not been pulsed.

This sequence of operations continues until finally the conductor 20 associated with AND gate 99 and the one-hundredth buffer core is pulsed. This conductor is connected, as are all of conductors 20, to the output 0 of flip-flop 10. However, the primary of transformer 11 is included in the path of this last one of conductors 20. The scan pulse causes an induced pulse in the transformer secondary which is applied to the R trigger of flip-flop 10. This pulse causes flip-flop 10 to switch state, once again connecting conductors 7 to ground through output 1 and open-circuiting conductors 20. All of the buffer cores have been reset by the 100 column scanning pulses and row scanning is now re-initiated.

The two ring counters would normally cause AND gate 00 to now operate as the count is at the 0 stage in each counter. However, if row 59 has just been scanned, it is not desirable to next scan row 00. While this would not be unfair to the subscriber as he can only be billed if his associated core has been set by message unit pulses, it might be disadvantageous for the telephone company. This is due to the fact that during busy hours may cores may be set during any scan cycle. If after the scanning of each row which contains at least one set core the scanning circuit was to revert to the first row, it is highly possible, without a much faster scan rate, that the last few rows of the matrix would never be scanned and the message units to be billed to the associated subscribers would go unrecorded. For this reason it is desirable for the two counter stages to resume row scanning with a row at least in the vicinity of the particular row containing the set cores priorly scanned.

In the illustrative embodiment the row scanning is resumed with the row number whose tens digit is the same as the previously scanned row and whose unit digit is 0. In the example chosen, this would be row 50. It is possible to resume the scan with the succeeding row 60 by providing a memory which remembers not only the tens digit of the row whose information has been transferred to the buffer cores but the units digit as well. This, however, would require twice the memory capacity now to be described and would not be necessary unless the array is quite large and it is desired to cut down the scanning period as much as possible.

When any stage, for example stage 0 of counter 3, is energized current flows from right to left in conductor 34 and causes a counterclockwise flux to be set in the associated core 32. The current flows through diode 26 and capacitor 27 to output 1 of flip-flop 10. This output is connected to ground during row scan and thus the core 32 associated with the energized stage 0 of ring counter 3 may be set. When stage 1 is energized the flux in the associated core 32 is likewise set in the counterclockwise direction. The setting of this flux causes an induced curent to flow in conductor 33 from top to bottom. This current reverses the flux in core 32 associated with stage 0. The induced current in conductor 33 can also flow because conductor 33 is connected through diode 28 and capacitor 29 to the grounded output 1 of flip-flop 10. Diodes 26 and 28 are included in the circuits so that the currents flowing in conductors 34 and 33 do not react with one another.

When stage 2 is energized the third core of the ten cores associated with ring counter 3 has its flux set in the counterclockwise direction and the flux in the second core is reset to the clockwise direction. This cycling of the set core continues as long as row scanning is maintained.

In this manner when a voltage is induced in conductor 13, indicative that a particular row being scanned contains set cores, and the two ring counters are reset to 0 for the buffer scan, only that core associated with the tens digit of the scanned row has its flux set in the counterclockwise direction.

After buffer scanning, output terminal 1 is suddenly connected to ground due to the application of a reset pulse to the R trigger of flip-flop 10. At this time conductor 45 is suddenly connected to ground. Source 30 causes current to flow through resistor 31, conductor 33, diode 28, capacitor 29, and conductor 45 to ground, this current decaying exponentially until capacitor 29 charges to the potential of source 30. Initially, there is a large surge of current. This current flows in a direction through each of the cores 32 in such a manner as to cause a clockwise flux to be set in these cores. However, nine of these cores already contain a clockwise direction of flux and consequently there is no flux reversal in these cores. Only that core representative of the tens digit of the row previously scanned and which contains a clockwise direction of flux switches. The switching of this flux induces a voltage in the respective conductor 34 which causes the associated stage of the ring counter to be set. In the illustrative example stage 5 is set in ring counter 3. The scanning thus resumes with row 50.

It should be observed that when any core is set by an energized stage and the previous core is switched, a voltage is induced in the previous corresponding conductor which is in a direction to cause current flow from right to left. This would ordinarily energize the previous stage which would be highly undesirable. However, current flowing from right to left in the conductor 34 associated with the energized stage divides not only into diode 26 but into all of the other conductors 34 and flows from left to right. This current overrides the current caused by the induced voltage on the previous conductor 34 flowing from right to left and the previous stage remains unenergized.

Capacitor 29 discharges during the buffer scanning sequence. During buffer scanning capacitor 29, connected to output 1 of flip-flop 10, is connected to ground through a high impedance. This impedance is large enough to prevent row scanning when the flip-flop is in the reset state as currents insufficient to switch cores 6 flow in conductors 7. However, the impedance is adequate to permit capacitor 29 to discharge through it during the buffer scanning. In this manner, capacitor 29 permits another surge of current to flow after buffer scanning to set the appropriate stage of ring counter 3 for resuming row scanning.

Our invention is not limited to the circuit just described for setting the proper stage of ring counter 3 when row scanning is resumed, although a circuit of this genre is necessary for the instant invention wherever a ring counter or register is utilized for more than one operation and it is necessary to remember or register the first count and automatically set the proper stage for resuming it after completing the second operation.

It is seen that with the present invention the scanning period may be appreciably reduced. This is due to the fact that a single row scanning pulse transfers an entire row of information to the buffer cores. In the event that not even one of the 100 cores in the row had been set by a message unit pulse it is not necessary to scan the buffer cores as all of them are in the reset condition. The next row may be scanned. Effectively 100 cores have been scanned with the application of a single scanning pulse. In addition, the same scanner may be used for both matrix and buffer scanning with a consequent reduction in the cost of the equipment.

Although our invention has been described with a certain degree of particularity, it is to be understood that the present disclosure has been made only by way of example and that numerous changes and variations in the combination and arrangements of component elements may be resorted to without departing from the spirit and scope of the invention.

What is claimed is:

1. A matrix array comprising a plurality of magnetic cores arranged in rows and columns, a plurality of means including first conductor means each coupled to a respective one of said cores for setting said cores in a first stable state, a plurality of second conductor means each coupled to all cores in a respective one of said rows, first means for sequentially applying currents to said second conductor means for setting said cores in a second stable state, a row of buffer cores, a plurality of third conductor means each coupling all of said cores in a respective one of said columns to an individual one of said buffer cores for setting said buffer cores in a first stable state in response to the setting of said matrix cores in said second stable state, a plurality of fourth conductor means each coupled to a respective one of said buffer cores, second means for sequentially applying currents to said fourth conductor means in response to the setting of at least one of said buffer cores in said first stable state for setting said buffer cores in a second stable state, and means for detecting the setting of said buffer cores in said second stable state.

2. A combination is accordance with claim 1 including means for inhibiting said first sequential current applying means during the operation of said second sequential current applying means.

3. A combination in accordance with claim 1 including means for registering the number of any row in response to at least one core in said row being set in said second stable state, and means for registering the number of any column coupled to a particular buffer core in response to said particular buffer core being set in said second stable state.

4. A matrix array comprising a plurality of magnetic cores arranged in rows and columns, a plurality of means including first conductor means each coupled to a respective one of said cores for setting said cores in a first stable state, a plurality of second conductor means each coupled to all cores in a respective one of said rows, current means connected to said second conductor means for sequentially setting said cores in a second stable state, a row of buffer cores, a plurality of third conductor means each coupling all of said cores in a respective one of said columns to an individual one of said buffer cores for setting said buffer cores in a first stable state in response to the switching of said matrix cores to said second stable state, first means for detecting the switching of any one of said buffer cores to said first stable state, a plurality of fourth conductor means each coupled to a respective one of said buffer cores, means controlled by said first detecting means for transferring said current means from said second conductor means to said fourth conductor means for sequentially setting said buffer cores in a second stable state, and second means for detecting the switching of said buffer cores to said second stable state.

5. A combination in accordance with claim 4 including means for registering the numbers of said rows which include cores switched to said second stable state by said current means, and means for registering the number of any buffer core in response to the switching of said buffer core to said second stable state.

6. A combination in accordance with claim 5 including means for controlling the recording of said row and buffer core numbers simultaneously in response to the switching of said buffer cores to said second stable state.

7. A matrix array comprising a plurality of memory devices arranged in rows and columns, means for setting said devices in a first stable state, a plurality of means each connecting all of said devices in a respective one of said rows, means for sequentially energizing said connecting means for setting said memory devices in a second stable state, a row of buffer bistable devices, a plurality of means each connecting all of said memory devices in a respective one of said columns to an individual one of said buffer devices for setting said buffer devices in a first stable state in response to the switching of said memory devices to said second stable state, a plurality of means each connected to a respective one of said buffer devices, means for transferring said sequential energizing means from said row connecting means to said individual buffer connecting means for setting said buffer devices in a second stable state in response to the setting of at least one of said buffer devices in said first stable state, means for detecting the setting of said buffer devices in said second stable state, and means connected to said memory and buffer devices for registering the row and column number of said devices set in said second stable state.

8. A matrix array comprising a plurality of magnetic cores having first and second remanent polarization states, said cores being arranged in rows and columns, means for setting said cores in said first stable state, means for simultaneously setting all cores in any one of said rows in said second polarization state, means for controlling said row setting means to operate on said rows sequentially, temporary memory means, means for transferring the information stored in any one of said rows to said temporary memory means in response to the operation of said row setting means upon said one row, and means for scanning said temporary memory means and for inhibiting said row setting means in response to one or more of said cores in said one row being switched to said second polarization state by said row setting means.

9. A matrix array comprising a plurality of groups of memory devices having first and second stable states, first means for setting said devices in said first stable state, second means for simultaneously setting all devices in a single one of said groups in said second stable state and operating on said groups sequentially, temporary memory means, means for transferring the information stored in any one of said groups to said temporary memory means in response to the operation of said second setting means upon said one group, means for scanning said temporary memory means and for inhibiting said second setting means in response to at least one of said devices in said one group being switched to said second stable state by said second setting means, and means for registering both the group number and the position in said group of all of said devices switched by said second setting means.

10. In a telephone system, an electronic message regitser comprising a magnetic memory core matrix array having rows and columns, means including a winding uniquely coupled to each core of said matrix for setting a core on usage of an associated subscriber line, a row of buffer magnetic cores, means for transferring information stored in any core in a column of said matrix to a unique buffer core, means for scanning successive rows of cores of said matrix to reset any set core and for operating said transferring means, and means for interrupting said matrix row scanning and for scanning said buffer cores individually on resetting of any one of said matrix cores.

11. A matrix array of magnetic cores arranged in rows and columns comprising means including a winding uniquely coupled to each core of said matrix for setting said cores, a row of buffer magnetic cores, means for scanning successive rows of cores of said matrix to reset any set core and for scanning successive buffer cores, means for transferring information stored in any core in a column of said matrix to a unique buffer core responsive to the resetting of said core, means for transferring said scanning means from said rows to said buffer cores in response to the resetting of any one of said matrix cores, and means for transferring said scanning means back to said rows after the completion of said buffer core scanning.

12. In a telephone system, an electronic usage register comprising a magnetic memory core matrix array having rows and columns, means including a winding uniquely coupled to each core of said matrix for setting a core on usage of an associated subscriber line, a row of buffer magnetic cores, a plurality of first conductor means each coupling all cores in a respective one of said columns to a unique one of said buffer cores, a switching circuit having first and second terminals, a plurality of second conductors each coupled to all cores in a respective one of said rows and connected to said first terminal, a plurality of third conductors each coupled to a respective one of said buffer cores and connected to said second terminal, current means connected to said second and third plurality of conductors for sequentially energizing said conductors, means for energizing said first terminal for enabling a current to flow in said second plurality of conductors to reset said matrix cores, said first plurality of conductor means being responsive to the resetting of said matrix cores for generating currents to set said buffer cores, first means for detecting the setting of any one of said buffer cores for de-energizing said first terminal and for energizing said second terminal to enable currents to flow in said third plurality of conductors to reset said buffer cores, and second means for detecting the resetting of said buffer cores.

13. An electronic usage register in accordance with claim 12 further including means connected to said current means for registering the number of any row containing cores switched to the reset condition by said current means and additional means connected to said current means for registering the number of any column coupled to a buffer core switched to the reset condition by said current means.

14. An electronic usage register in accordance with claim 12 further including means responsive to said first detecting means for registering the approximate number of any row containing at least one core switched to the reset condition by said current means, and wherein said current means initially energizes the conductor of said second plurality of conductors whose number was priorly registered in said register means responsive to the energization of said first terminal.

15. An electronic usage register in accordance with claim 14 including means for operating said first terminal energizing means responsive to the completion of the sequential energization of all of said conductors in said third plurality.

16. An electronic usage register in accordance with claim 15 wherein said third plurality of conductors are always sequentially energized beginning with the same conductor responsive to the energization of said second terminal.

17. In combination, a ring counter having a plurality of stages, a plurality of two remanent polarization state magnetic cores, conductor means individually connected to said stages and passing through different ones of said cores for setting the one core connected to the energized stage of said ring counter, a switching circuit, potential source means, and a series circuit including impedance means connecting said potential source means to said switching circuit and passing through each of said cores for energizing the stage of said counter connected to said one core in response to the operation of said switching circuit.

18. A circuit for identifying the energized stage of a register and for energizing this stage at a subsequent time comprising an individual bistable element connected to each stage of said register, means for setting the one bistable element connected to said energized stage in a first stable state, means for setting the other of said bistable elements in a second stable state in response to the setting of said one bistable element in said first stable state, means coupled to all of said bistable elements for switching only said one bistable element in said first stable state to said second stable state, and means for energizing the stage of said register connected to said one bistable element in response to the switching of said one bistable element from said first to said second stable state.

19. A circuit for controlling the energization of the stages of a register, where each of said stages has first and second energization states, comprising a plurality of magnetic cores each having first and second magnetization states, switching means, means including a plurality of conductors each passing through a respective one of said cores and connecting a respective one of said stages to said switching means for setting each of said cores in said first magnetization state responsive to the respective stage being maintained in said first energization state and in said second magnetization state responsive to the respective stage being maintained in said second energization state, energizing means, and means including a conductor passing through all of said cores and connecting said energizing means to said switching means for setting each of said stages in said first energization state responsive to the respective core being maintained in said first magnetization state and in said second energization state responsive to the respective core being maintained in said second magnetization state.

References Cited in the file of this patent

UNITED STATES PATENTS

| | | |
|---|---|---|
| 2,708,267 | Weidenhammer | May 10, 1955 |
| 2,749,437 | Parr | June 5, 1956 |
| 2,854,517 | Heetman | Sept. 30, 1958 |
| 3,008,126 | Estrem | Nov. 7, 1961 |